(12) United States Patent
Tin

(10) Patent No.: US 11,612,010 B2
(45) Date of Patent: Mar. 21, 2023

(54) SYSTEM AND METHOD FOR ULTRA LOW LATENCY WIRELESS MEDIA STREAMING

(71) Applicant: ZULLIKON LIMITED, Hong Kong (HK)

(72) Inventor: Wai Kuen Tin, Hong Kong (HK)

(*) Notice: Subject to any disclaimer, the term of this patent is extended or adjusted under 35 U.S.C. 154(b) by 102 days.

(21) Appl. No.: 17/032,972

(22) Filed: Sep. 25, 2020

(65) Prior Publication Data

US 2022/0104290 A1 Mar. 31, 2022

(51) Int. Cl.
| | |
|---|---|
| H04W 24/04 | (2009.01) |
| H04L 29/08 | (2006.01) |
| H04W 76/15 | (2018.01) |
| H04L 1/1607 | (2023.01) |
| H04W 76/18 | (2018.01) |
| H04W 76/14 | (2018.01) |

(52) U.S. Cl.
CPC .......... *H04W 76/15* (2018.02); *H04L 1/1607* (2013.01); *H04W 76/14* (2018.02); *H04W 76/18* (2018.02)

(58) Field of Classification Search
None
See application file for complete search history.

(56) References Cited

U.S. PATENT DOCUMENTS

| | | | |
|---|---|---|---|
| 6,574,668 B1 | 6/2003 | Gubbi et al. | |
| 8,787,468 B2* | 7/2014 | Truong | H04W 72/082 455/448 |
| 8,839,065 B2 | 9/2014 | Rajapakse | |
| 10,057,015 B1* | 8/2018 | Naim | H04L 1/1822 |
| 10,149,073 B2* | 12/2018 | Polinske | H04R 25/554 |
| 10,341,758 B1* | 7/2019 | Tong | G06F 3/162 |
| 10,834,661 B2* | 11/2020 | Joseph | H04W 40/246 |
| 11,019,633 B2* | 5/2021 | Kwok | H04W 72/0486 |
| 11,134,518 B2* | 9/2021 | Liu | H04L 1/1819 |
| 11,233,888 B2* | 1/2022 | Alcorn | H04M 1/72412 |
| 11,425,581 B2* | 8/2022 | Teyeb | H04W 76/15 |
| 11,464,027 B2* | 10/2022 | Seok | H04W 72/1215 |
| 2008/0192806 A1* | 8/2008 | Wyper | H04J 3/1694 375/E1.033 |
| 2018/0084456 A1* | 3/2018 | Gostev | H04W 84/18 |
| 2018/0270753 A1* | 9/2018 | Recker | H04L 69/14 |
| 2019/0104424 A1 | 4/2019 | Hariharan et al. | |
| 2020/0336199 A1* | 10/2020 | Ashworth | H04B 7/15542 |

* cited by examiner

*Primary Examiner* — Sithu Ko
(74) *Attorney, Agent, or Firm* — Egbert, McDaniel & Swartz, PLLC

(57) ABSTRACT

A system for wireless media streaming in ultra-low latency including: a source device transmitting payload to at least one destination device and receiving acknowledgement from at least one destination device; at least one destination device receiving payload from the source device and transmitting acknowledgement to the source device; wherein the source device is a primary wireless module which provides a primary wireless link and a secondary wireless module which provides a secondary wireless link, the primary wireless link for transmitting of payload to at least one destination device and the secondary wireless link for receiving acknowledgement from at least one destination device. The destination device is a primary wireless module providing a primary wireless link and a secondary wireless module providing a secondary wireless link, the primary wireless link for receiving payload from the source device and the secondary wireless link for transmitting acknowledgement to the source device.

16 Claims, 9 Drawing Sheets

SYSTEM AND METHOD FOR ULTRA LOW LATENCY WIRELESS MEDIA STREAMING

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

This invention relates to a wireless media streaming, more particularly relates to a system and method for ultra-low latency wireless media streaming.

2. Description of Related Art Including Information Disclosed Under 37 CFR 1.97 and 37 CFR 1.98

Generally, media streaming has a wide latency range. Low latency is usually determined in terms of milliseconds (ms) whereby humans may consider under 20 ms are low latency, and above 100 ms are high latency, this invention intended to reduce the latency to under 10 ms. Low latency streaming is required in varieties condition such as when there are two-way communications, video gaming, conference call, wireless headphone, wireless speakers and etcetera.

In order to achieve a low latency for online streaming, there are some limitations that has to come across that are beyond our control. This is because latency is affected by several factors. We might be able to deal with some of the said factors, but others could be too expensive or impractical to change. These factors include bandwidth, connection type, encoding, video format, distance and etcetera.

A wireless media streaming is a delivery of audio and video data over wireless connection. Said streaming is the continuous transmission of audio or video files from a server to a client and use via a smartphone, tablet, laptop, wireless headphone, speakers, display and/or dedicated receiving device. Therefore, a latency can be problematic when it comes to wireless transmission between devices. This is because said latency refers to how much time it takes for transmission of media to its destination and back.

United States Patent Application No. 20190104424 A1 has disclosed a method and apparatus for communicating audio packets with ultra-low latency at high data rates from an audio source device to one or more audio output devices over a wireless personal area network connection such as Bluetooth connection. Latency is reduced by using time-efficient audio coding and decoding, limited retransmission, reduced time and frequency of acknowledgements, and by combining Bluetooth classic packets for downlink audio and downlink control with Bluetooth Lowe Energy (BTLE) packets for uplink control, uplink acknowledgements, and inter-device wireless communication. The number of retransmissions and packet concealments per frame cycle can be limited to an upper threshold number to satisfy a low latency requirement. However, said method and apparatus is only applicable for reducing audio latency over Bluetooth. This may be limiting to audio source device and audio output devices. Said method and apparatus is also applicable with the sole use of physical wireless link. The source device is not able to send payload and retransmit payload at the same time.

U.S. Pat. No. 8,839,065 B2 has disclosed a low latency media applications where it is important to transmit media data packets from a media source to one or more media destinations as promptly as possible, while also ensuring that all media data packets that may be lost due to transmission errors are retransmitted and received correctly at the media destination. Said system and method for anticipating media data packet loss and making preemptive media data packet retransmission requests of the media source. However, said method may require complicated steps because require Loss Anticipation and Preemption algorithm (LAP) for keeping loss detection delay low. A metric is computed for the chance of a packet that has not been received as being lost. This metric is based on and therefore adversely affected by multiple factors; the order of receipt; delay in receipt and need for data expressed by an application using the media data.

U.S. Pat. No. 6,574,668 B1 disclosed a retransmission scheme in wireless computer networks. Data is transmitted over a computer network from a source network component to one or more destination network components. Thereafter, one or more acknowledgements are transmitted from one of the destination network components to the source network component; and different data, which may include retransmissions, from the previously transmitted data is transmitted from the source network component to the one or more destination network components. However, said method of retransmission of data in computer networks is only able to retransmit of data that may have been lost sometimes after being transmitted by the transmitting node. Said method may not be able to reduce latency while retransmitting the lost data.

According to existing prior arts, there is a need to have an effective system and method for ultra-low latency wireless media streaming, which could transfer media data efficiently and reliably.

BRIEF SUMMARY OF THE INVENTION

It is an objective of the present invention to provide an improved system and method for ultra-low latency wireless media streaming.

It is also an objective of the present invention to provide a method for ultra-low latency wireless media streaming, which could transfer media data efficiently and reliably.

Accordingly, these objectives may be achieved by following the teachings of the present invention. The present invention relates to a system for wireless media streaming in ultra-low latency characterized in that: a source device for transmitting payload to at least one destination device and receiving acknowledgement from at least one destination device; at least one destination device for receiving payload from the source device and transmitting acknowledgement to the source device; wherein the source device consists a primary wireless module configured to provide the primary wireless link and a secondary wireless module configured to provide the secondary wireless link, such primary wireless link for transmitting of payload to at least one destination device and such secondary wireless link for receiving acknowledgement from at least one destination device; wherein the destination device consists of a primary wireless module configured to provide the primary wireless link and a secondary wireless module configured to provide the secondary wireless link, such primary wireless link for receiving payload from the source device and such secondary wireless link for transmitting acknowledgement to the source device.

BRIEF DESCRIPTION OF THE SEVERAL VIEWS OF THE DRAWINGS

The features of the invention will be more readily understood and appreciated from the following detailed description when read in conjunction with the accompanying drawings of the preferred embodiment of the present invention, in which.

DETAILED DESCRIPTION OF THE INVENTION

Figure 1:
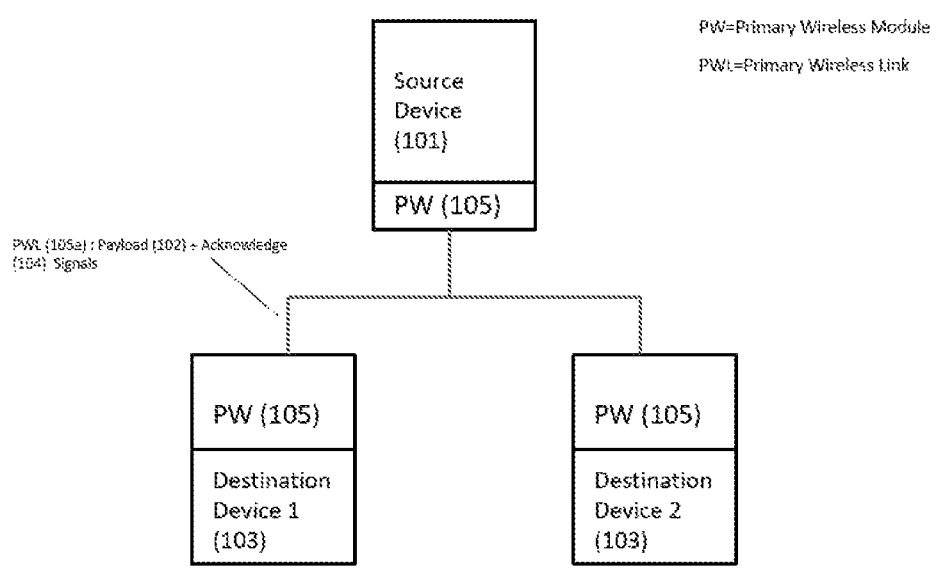
FIG. 1 shows a block diagram of the common media data transfer.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modifications, equivalents and alternatives falling within the scope of the present invention as defined by the appended claims. As used throughout this application, the word "may" is used in a permissive sense (i.e., meaning having the potential to), rather than the mandatory sense (i.e., meaning must) Similarly, the words "include," "including," and "includes" mean including, but not limited to. Further, the words "a" or "an" mean "at least one" and the word "plurality" means one or more, unless otherwise mentioned. Where the abbreviations or technical terms are used, these indicate the commonly accepted meanings as known in the technical field. The present invention will now be described with reference to FIG. 9.

The present invention presents a system for wireless media streaming in ultra-low latency (100) characterized in that: a source device (101) for transmitting payload (102) to at least one destination device (103) and receiving acknowledgement (104) from at least one destination device (103); at least one destination device (103) for receiving payload (102) from the source device (101) and transmitting acknowledgement (104) to the source device (101); wherein the source device (101) consists a primary wireless module (105) configured to provide a primary wireless link (105a) and a secondary wireless module (106) configured to provide a secondary wireless link (106a), such primary wireless link (105a) for transmitting of payload (102) to at least one destination device (103) and such secondary wireless link (106a) for receiving acknowledgement (104) from at least one destination device (103); wherein the destination device (103) consists of a primary wireless module (105) configured to provide a primary wireless link (105a) and a secondary wireless module (106) configured to provide a secondary wireless link (106a), such primary wireless link (105a) for receiving payload (102) from the source device (101) and such secondary wireless link (106a) for transmitting acknowledgement (104) to the source device (101).

In a preferred embodiment of the present invention, the transmission of payload (102) from the source device (101) to one destination device (103) by primary wireless link (105a) and transmission of acknowledgement (104) from one destination device (103) to the source device (101) by secondary wireless link (106a) are configured as a one to one connection. It is possible to have multiple one-to-one connection within a system.

In a preferred embodiment of the present invention, the transmission of payload (102) from the source device (101) to at least two destination devices (103) by primary wireless link (105a) and transmission of acknowledgement (104) from at least two destination devices (103) to the source device (101) by secondary wireless link (106a) are configured as a one to many connection.

In a preferred embodiment of the present invention, the payload (102) is retransmitted as secondary payload (102) by secondary wireless link (106a) from the source device (101) to at least one destination device (103) for unsuccessful transmission of payload (102) by primary wireless link (105a) from the source device (101) to such any destination device (103).

In a preferred embodiment of the present invention, the secondary wireless module (106) in the destination devices (103) further comprises a private channel (107) for communicating between at least two destination devices (103) by secondary wireless link (106a).

In a preferred embodiment of the present invention, the private channel (107) is configured to transmit and receive alternative payload (108) and alternative acknowledgement (109).

In a preferred embodiment of the present invention, the alternative payload (108) is transmitted from at least one destination device (103) to at least one other destination device (103) and alternative acknowledgment (109) is transmitted from at least one other destination device (103) to at least one destination device (103) within the private channel (107) by secondary wireless link (106a) for unsuccessful transmission of payload (102) by primary wireless link (105a) from the source device (101) to such at least one other destination device (103).

In a preferred embodiment of the present invention, the media data comprises video and audio.

In a preferred embodiment of the present invention, the primary wireless link (105a) comprises high speed wireless local area network (WLAN) and/or Bluetooth network (BT). The transmission latency of primary wireless link (105a) are usually ranged from 5 ms to 50 ms.

In a preferred embodiment of the present invention, the secondary wireless link (106a) comprises ultra-low latency ISM band network. The ISM band comprises 2.4 GHz or 5.8 GHz, wherein said ultra-low latency secondary wireless link (106a) are usually less than primary wireless link (105a), in particular, the transmission latency in secondary wireless link (106a) is 1 ms less than the primary wireless link (105a).

The present invention presents a system for wireless media streaming in ultra-low latency (110) characterized in that: a source device (101) for transmitting payload (102) to at least two destination device (103) and receiving acknowledgement (104) from at least two destination device (103); at least two destination devices (103) for receiving payload (102) from the source device (101) and transmitting acknowledgement (104) to the source device (101); wherein one of the destination devices (104) is a master destination device (111); wherein the source device (101) consists a primary wireless module (105) configured to provide a primary wireless link (105a), such primary wireless link (105a) for transmitting of payload (102) to at least two destination devices (103) and receiving acknowledgement (104) from the master destination device (111); wherein the destination device (103) consists of a primary wireless module (105) configured to provide a primary wireless link (105a) and a secondary wireless module (106) configured to provide a secondary wireless link (106a), such primary wireless link (105a) for receiving payload (102) from the source device (101) and such secondary wireless link (106a) for transmitting acknowledgement (104) to the master destination device (111) and/or receiving acknowledgement (104) from at least one other destination device (103); wherein the master destination device (111), such primary wireless link (105a) for further transmitting acknowledgement (104) to the source device (101); wherein such system (110) is configured as a virtual handshake connection. The secondary wireless module (106) in the destination device (103) further comprises a private channel (107) for communicating between at least two destination devices (103) by secondary wireless link (106a); the private channel (107) is configured to transmit and receive alternative payload (108) and alternative acknowledgement (109).

The present invention further presents a method for wireless media streaming in ultra-low latency (100) comprising the steps of: transmitting payload (102) from a source device (101) to at least one destination device (103) through a primary wireless module (105); receiving and detecting successful or unsuccessful receival of the payload (102) by the at least one destination device (103) through the primary wireless module (105); transmitting acknowledgement (104) from the at least one destination device (103) to the source device (101) through a secondary wireless module (106); receiving the acknowledgement (104) by the source device (101) through the secondary wireless module (106); and wherein the primary wireless module (105) configured to provide a primary wireless link (105a) and the secondary wireless module (106) configured to provide a secondary wireless link (106a).

The present invention also presents a method for wireless media streaming in ultra-low latency (110) comprising the steps of: transmitting payload (102) from a source device (101) to at least two destination devices (103) through a primary wireless module (105); receiving and detecting successful or unsuccessful receival of the payload (102) by the at least two destination devices (103) through the primary wireless module (105); configuring one of the destination devices (103) as master destination device (111); transmitting acknowledgement (104) to the master destination device (111) through a secondary wireless module (106) and master destination device (111) further transmitting acknowledgement (104) to the source device (101); receiving the acknowledgement (104) by the source device (101) through the secondary wireless module (106); wherein the primary wireless module (105) configured to provide a primary wireless link (105a) and the secondary wireless module (106) configured to provide a secondary wireless link (106a). The secondary wireless module (106) in the destination devices (103) further comprises a private channel (107) for communicating between at least two destination devices (103) by secondary wireless link (106a); the private channel (107) is configured to transmit and receive alternative payload (108) and alternative acknowledgement (109).

Below is the example of the system and method for wireless media streaming in ultra-low latency (100, 110), from which the advantages of the present invention may be more readily understood. It is to be understood that the following examples are for illustrative purpose only and should not be construed to limit the present invention in any way.

Two wireless modules (105, 106) are generated in the present invention to work jointly for streaming media transfer from one source device (101) to at least one destination device (103). Said wireless modules (105, 106) comprise a primary wireless module (105) configured to provide the primary wireless link (105a) and a secondary wireless module (106) configured to provide the secondary wireless link (106a). Referring to FIG. 1, a block diagram of the common media data transfer is shown. The source device (101) and at least one destination device (103) comprises solely a primary wireless module (105). The media data is transmitted and received through a primary wireless link (105a) wherein the payload (102) and acknowledgement (104) are in unidirectional.

Figure 2:
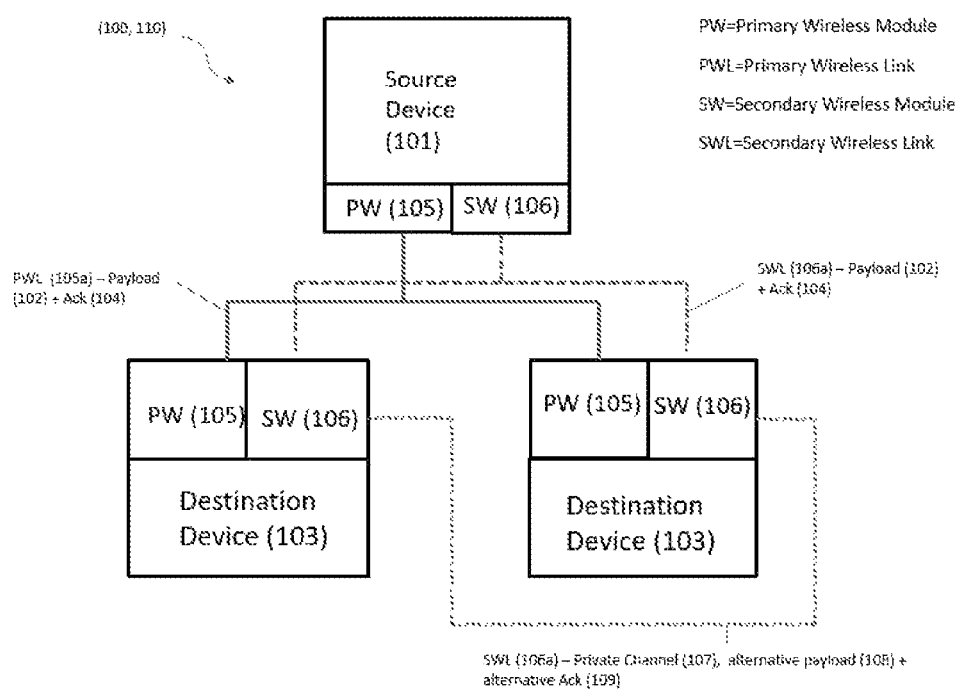
FIG. 2 shows a block diagram of the media data transfer in the present invention.

A block diagram of media data transfer comprises a primary wireless module (105) and a secondary wireless module (106) in the present invention is shown in FIG. 2. Referring to FIG. 2, source device (101) and destination devices (103) are communicated through primary wireless link (105a) and secondary wireless link (106a). The destination devices (103) are communicated with each other through secondary wireless link private channel (107).

Figure 3:
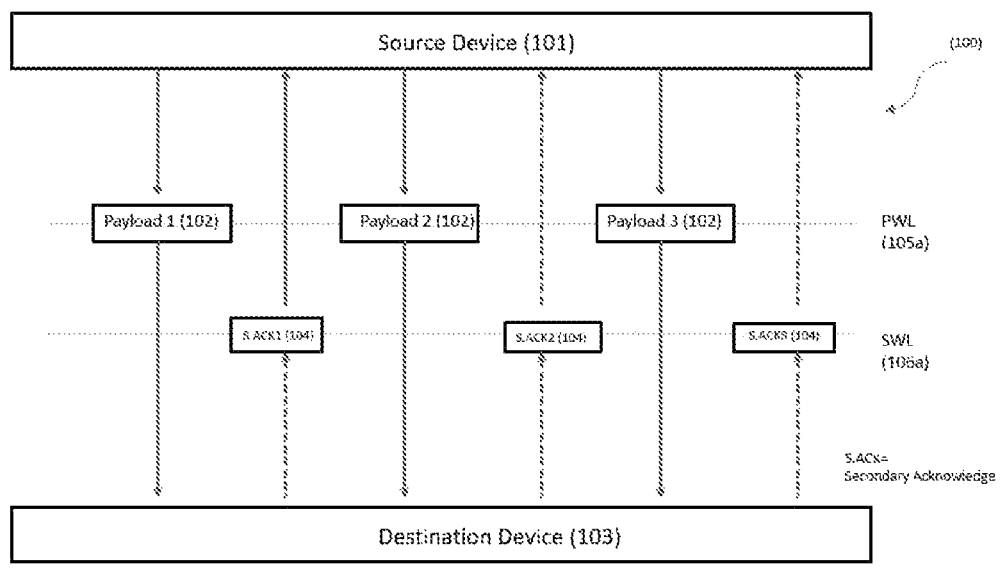
FIG. 3 shows a block diagram of all payload successful sent for one to one connection.

Primary wireless link (105a) is set at transmit state and secondary wireless link (106a) is set at receive state for the source device (101), while primary wireless link (105a) is set at receive state and secondary wireless link (106a) is set at transmit state for the destination device (103) in one to one connection. The source device (101) transmits the payload (102) to the destination device (103) through primary wireless link (105a) whereby the destination device (103) receives the payload (102) through primary wireless link (105a). The destination device (103) will immediately respond a positive acknowledgement (104) signal to the source device (101) through the secondary wireless link (106a) if the payload (102) is successfully sent to destination device (103). In FIG. 3, a block diagram of all payload (102) successful sent for one to one connection is shown. The source device (102) transmits payload (102) through primary wireless link (105*a*) and destination device (103) receives all the payload (102) successfully through primary wireless link (105*a*). Accordingly, the destination device (103) transmits acknowledgement (104) to the source device (101) through secondary wireless link (106*a*).

Figure 4:
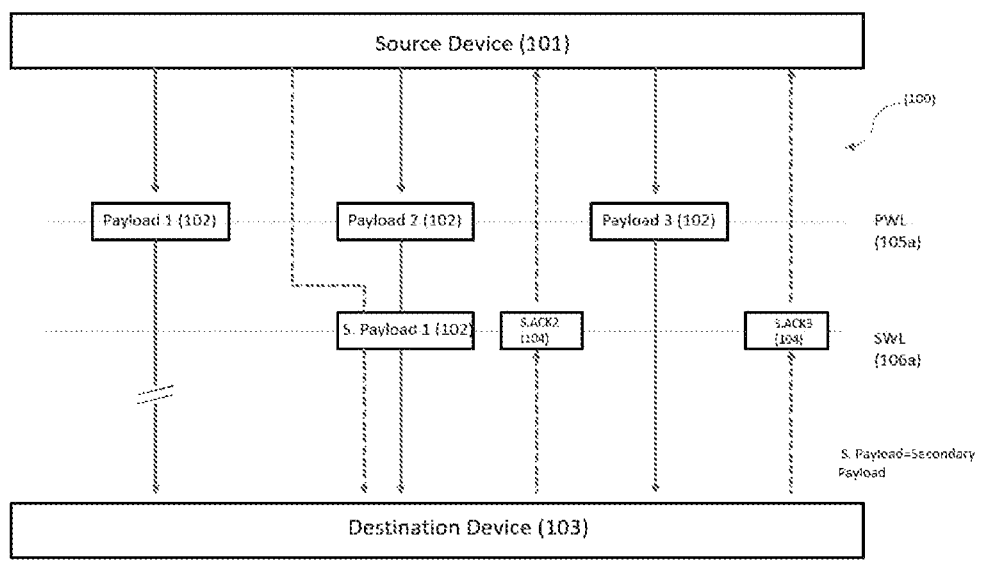
FIG. 4 shows a block diagram of retransmission payload using secondary wireless link for one to one connection.

FIG. 4 shows a block diagram of retransmission of payload (102) using secondary wireless link (106*a*) for one to one connection. The source device (101) is not receiving a positive acknowledgement (104) or a negative acknowledgement (104) from the destination device (103) with a very short period, hence the source device (101) is retrying and resubmit the payload (102) through secondary wireless link (106*a*). The primary wireless link (105*a*) in the source device (101) is remained in transmit state, and therefore the payload (102) is resubmitted through secondary wireless link (106*a*). As such, the latency is reduced due to primary wireless link (105*a*) is always remained as transmit state mode wherein no switching of transmit and receive state is needed. Therefore, the time for retransmission is reduced. It is also possible to have multiple one-to-one connection within a system such as wireless surround speakers and video doorbell system with multiple cameras wherein the speaker and video doorbell are connected independently within the system.

Figure 5:
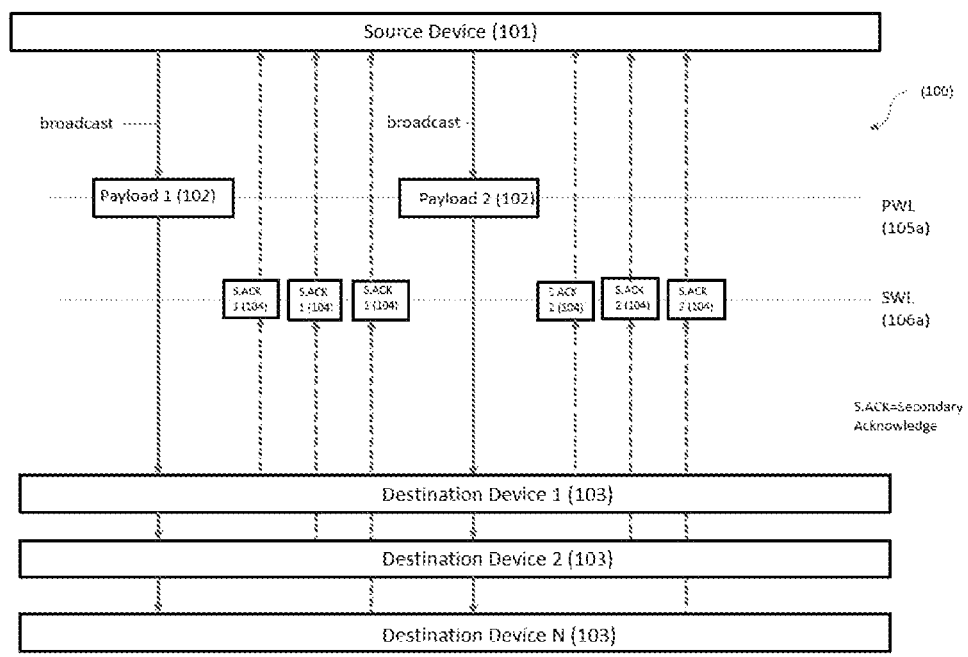
FIG. 5 shows a block diagram of all payload successful sent for one to many connections.

Source device (101) broadcasts the payload (102) with the primary wireless link (105*a*) to at least two destination devices (103) in one to many connections. All the destination devices (103) receive the payload (102) from the source device (101) through the primary wireless link (105*a*). An acknowledgement (104) will be sent by each of the destination devices (103) through the secondary wireless link (106*a*) wherein each secondary acknowledgement (104) should avoid collision and may use algorithm Carrier-Sense Multiple Access with Collision Detection (CSMA/CD) to avoid the collision. In FIG. 5, a block diagram of all payload (102) successful sent for one to many connections is shown. The source device (101) is broadcasting the payload through primary wireless link (105*a*) and all the destination devices (103) receive all the payload (102) successfully through primary wireless link (105*a*). Accordingly, the destination devices (103) transmit acknowledgement (104) to the source device (101) through secondary wireless link (106*a*). In situation of payload (102) cannot send to at least one of the destination devices (103), a retransmission of payload (102) will be started in according different scenarios.

Figure 6:
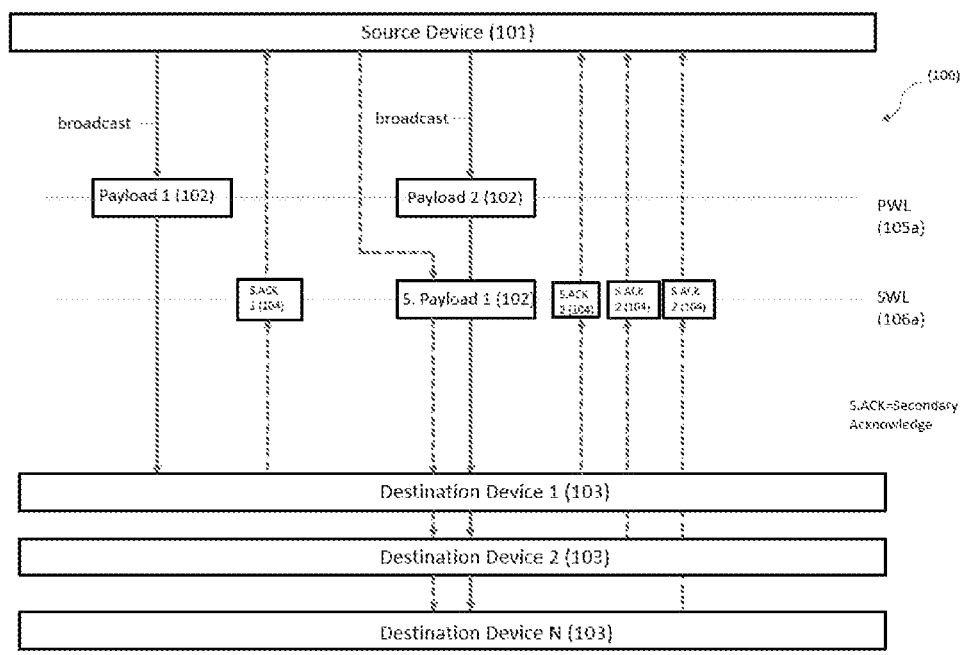
FIG. 6 shows a block diagram of retransmission payload using secondary wireless link for one to many connections.
Figure 7:
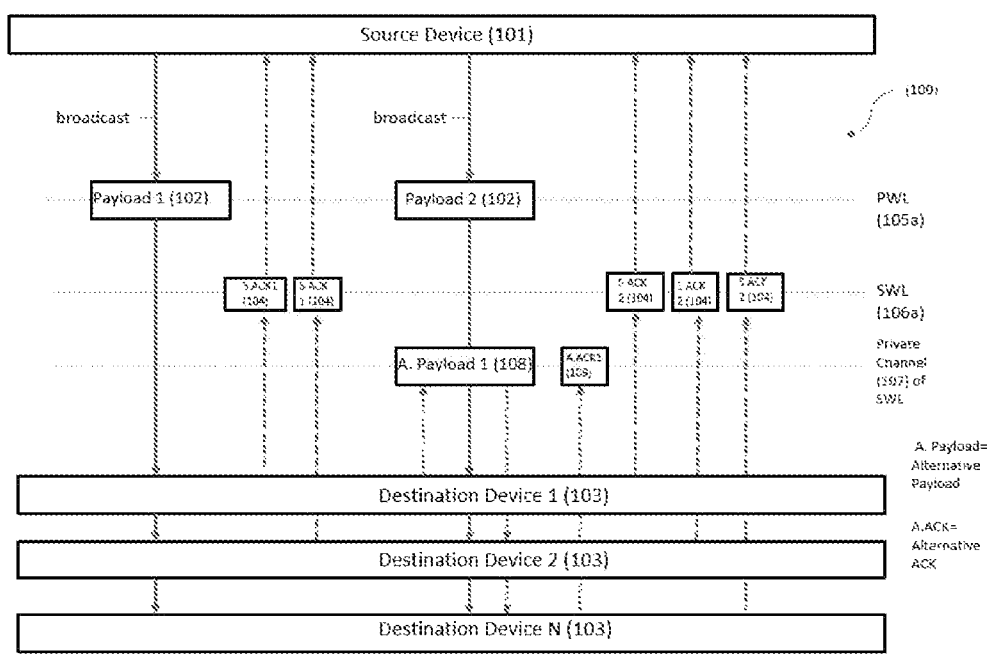
FIG. 7 shows a block diagram of retransmission payload using secondary wireless link private channel for one to many connections.

A block diagram of retransmission of payload (102) using secondary wireless link (106*a*) for one to many connections is shown in FIG. 6. The source device (101) considers all the destination devices (103) cannot receive payload (102), hence the source device (101) retransmit the secondary payload (102) through secondary wireless link (106*a*). Second scenario is shown in FIG. 7 wherein retransmission of payload (102) using secondary wireless link private channel (107). The source device (101) considers destination devices (103) could retransmit the data themselves, it continues send next payload (102). The destination device (103) receiving the payload (102) creates an alternative payload (108) and retransmits the alternative payload (108) to the remaining destination devices (103) using private channel (107) of secondary wireless link (106*a*). Therefore, alternative payload (108) and alternative acknowledgement (109) are transmitted and received from the destination device (103) during unsuccessful transmission of payload (102) by primary wireless link (105*a*) from the source device (101) to the destination devices (103).

Virtual handshake connection is applied when the source device (101) has primary wireless module (105) only, wherein secondary wireless link (106*a*) is used in between destination devices (103) with secondary wireless module (106). In said situation, the source device (101) has nothing to change in hardware or software, therefore all the destination devices (103) will pretend as one device to receive media data. The transmitted payload (102) from the source device (101) is not broadcasted and the destination device (103) may consider it as payload (102) broadcast. As such, the latency, data transfer efficiency and reliability are improved.

Figure 8:
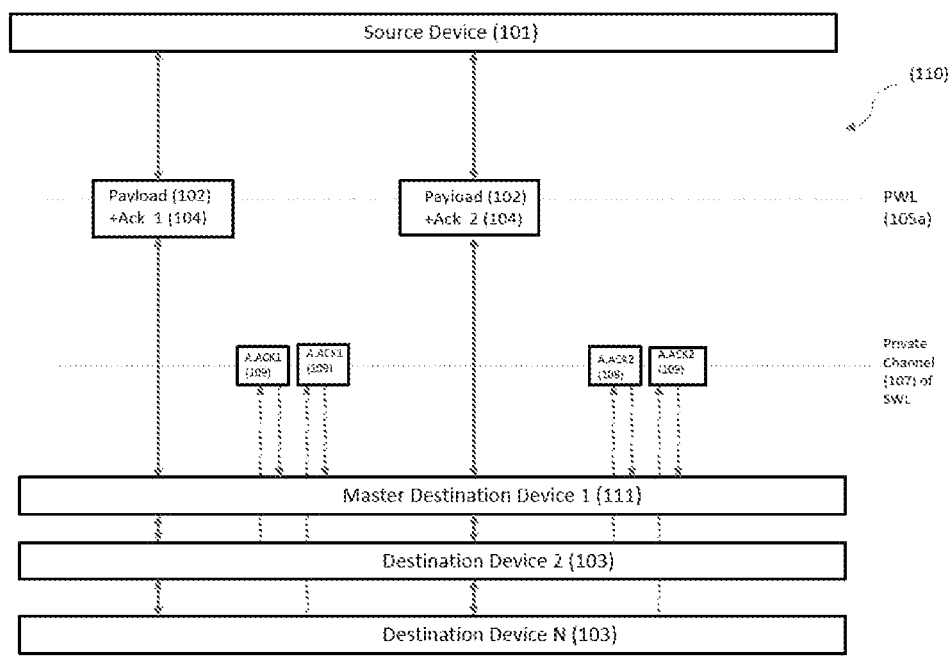
FIG. 8 shows a block diagram of all payload successful sent to destination devices through a master device for one to many connections.

One of the destination devices (103) is set as master destination device (111) in virtual handshake connection. Said master destination device (111) will communicate with source device (101) all the time. Any destination device (103) could be the master destination device (111) in a fixed period of time depends on the environment. In FIG. 8, a block diagram of all payload (102) successful sent to destination devices (103) is shown. All other destination device (103) will not communicate with source device (101) directly except the master destination device (111). Referring to FIG. 8, the source device (101) transmits payload (102) to all the destination devices (103) through primary wireless link (105) whereas and all the destination devices (103) received payload (102) from source device (101) through primary wireless link (105*a*) and communicate within each other through secondary wireless link private channel (107) to transmit alternative acknowledgement (108) to the master destination device (111) to confirm receiving the payload (102). The source device (101) received the acknowledgement (104) from the master destination device (111) through primary wireless link (105*a*).

Figure 9:
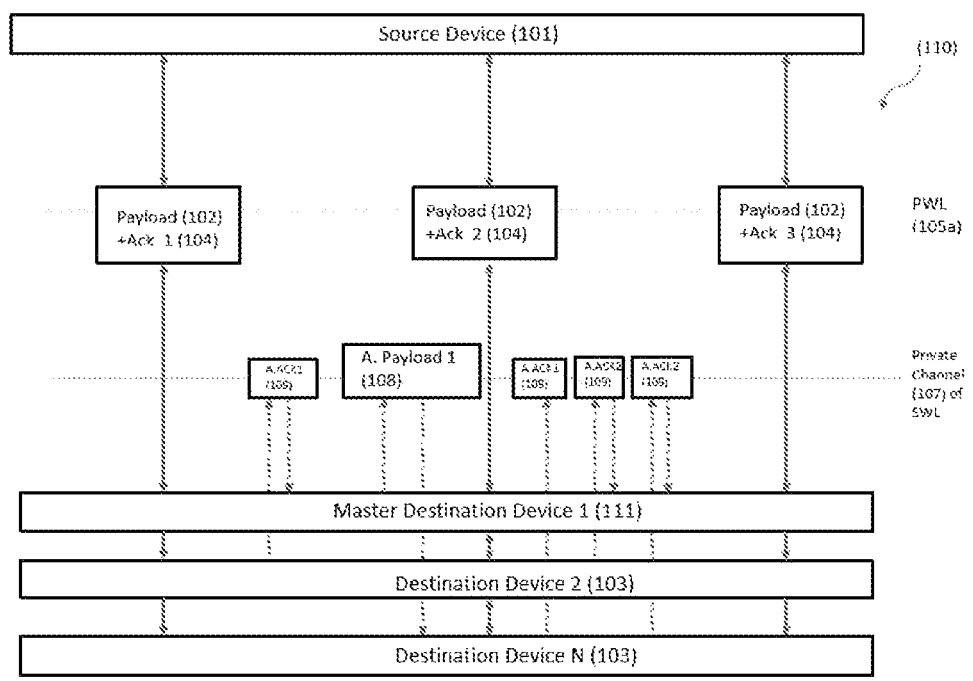
FIG. 9 shows a block diagram of retransmission payload within destination devices.

Also, the master destination device (111) handshake with source device (101) to retransmit the alternative payload (108) within the secondary wireless link private channel (107) if not all the destination devices (103) successfully receive payload (102) from source device (101) as shown in FIG. 9. The other destination devices (103) transmit alternative acknowledgement (109) when receiving the payload (102). If one of the destination devices (103) failed to receive the payload (102), the master destination device (107) transmits alternative payload (108) via private channel (107) of the secondary wireless link (106*a*).

Although the present invention has been described with reference to specific embodiments, also shown in the appended figures, it will be apparent for those skilled in the art that many variations and modifications can be done within the scope of the invention as described in the specification and defined in the following claims.

I claim:

1. A system for wireless media streaming in ultra-low latency, the system comprising:
a source device for transmitting a payload to at least one destination device and receiving an acknowledgment from the at least one destination device, the at least one destination device for receiving the payload from the source device and for transmitting acknowledgment to the source device, wherein the source device has a primary wireless module with a primary wireless link and a secondary wireless module with a secondary wireless link, the primary wireless link transmitting the payload to the at least one destination device and the secondary wireless link for the acknowledgment from the at least one destination device, wherein the at least one destination device has a primary wireless module with a primary wireless link and a secondary wireless module with a secondary wireless link, the primary wireless link of the at least one destination device receiving the payload from said source device and such secondary wireless link of the at least one destination device transmitting the acknowledgment to said source device, wherein the payload is re-transmitted as a secondary payload by the secondary wireless link from said source device to the at least one destination device upon an unsuccessful transmission of payload by the primary wireless link from said source device to such any destination device of the at least one destination device, wherein the unsuccessful transmission of payload is received and detected by the at least one destination device through the primary wireless module, wherein the secondary wireless module in the at least one destination device further comprises a private channel for communicating between the at least two destination device by the secondary wireless link, the private channel is configured to transmit and receive alternative payload and alternative acknowledgment, wherein the alternative payload is transmitted from the at least one destination device to at least one other destination device and the alternative acknowledgment is transmitted from the at least one other destination device to the at least one destination device within the private channel by the secondary wireless link for unsuccessful transmission of the payload by the primary wireless link from said source device to the at least one other destination device.

2. The system of claim 1, wherein transmission of the payload from said source device to one destination device of the at least one destination device by the primary wireless link and transmission of the acknowledgment from one destination device of the at least one destination device to said source device by the secondary wireless link are configured as a one-to-one connection.

3. The system of claim 1, wherein the at least one destination device comprises at least two destination devices, wherein transmission of the payload from said source device to the at least two destination devices by the primary wireless link and transmission of the acknowledgment from the at least two destination devices to said source device by the secondary wireless link are configured as a one-to-many connection.

4. The system of claim 1, wherein the payload is media data comprised of video and audio.

5. The system of claim 1, wherein the primary wireless link comprises a high speed wireless local area network and a Bluetooth network.

6. The system of claim 1, wherein the secondary wireless link comprises a low latency Industrial Scientific and Medical (ISM) band network.

7. The system of claim 1, wherein the ISM band has a frequency of 2.4 GHz or 5.8 GHz.

8. A system for wireless media streaming in ultra-low latency, the system comprising:
a source device for transmitting a payload to at least two destination devices and for receiving an acknowledgment from the at least two destination devices, the at least two destination devices receiving the payload from said source device and transmitting the acknowledgment to said source device, wherein one destination device of the at least two destination devices is a master destination device, wherein said source device comprises a primary wireless module with a primary wireless link, the primary wireless link for transmitting the payload to the at least two destination devices and receiving the acknowledgment from the master destination device, wherein the at least two destination devices comprises of a primary wireless module with a primary wireless link and a secondary wireless module with a secondary wireless link, the primary wireless link of the at least two destination devices for receiving the payload from the source device and the secondary wireless link of the at least two destination devices for transmitting the acknowledgment to the master destination device and receiving the acknowledgment from another of the at least two destination devices, wherein the master destination device and the primary wireless link further transmit an acknowledgment to said source device, wherein the system is configured as a virtual handshake connection between the secondary wireless modules of the at least two destination devices, including the master destination device, wherein the secondary wireless module of the at least two destination devices further comprises a private channel for communicating between the at least two destination devices by the secondary wireless link, wherein the private channel is configured to transmit and receive an alternate payload and an alternative acknowledgment, wherein the alternative acknowledgment is transmitted from at least one of the at least two destination devices to the master destination device, wherein the alternative payload is transmitted from at least one of the at least two destination devices to at least one other destination device within the private channel by the secondary wireless link upon an unsuccessful transmission of the payload by the primary wireless link from said source device to the at least one other of the two destination devices.

9. The system of claim 8, wherein the payload is media data comprised of video and audio.

10. The system of claim 8, wherein the primary wireless link comprises a high-speed wireless local area network (WLAN) and a Bluetooth network (BT).

11. The system of claim 8, wherein the secondary wireless link comprises a low latency Industrial Scientific and Medical (ISM) band network.

12. The system of claim 11, wherein the ISM band has a frequency of 2.4 GHz or 5.8 GHz.

13. A method for wireless media streaming in ultra-low latency, the method comprising:
transmitting a payload from a source device to at least one destination device of a primary wireless module;
receiving and detecting a successful or an unsuccessful receival of the transmitted payload by the at least one destination device through the primary wireless module;
transmitting an acknowledgment of the receiving and detecting from the at least one destination device to the source device through a secondary wireless module; and
receiving the acknowledgment by the source device through the secondary wireless module, wherein the primary wireless module is configured to provide a primary wireless link and the secondary wireless module is configured to provide a secondary wireless link, wherein the transmitting of the payload further comprises:
a re-transmitting the payload as a secondary payload by the secondary wireless link from the source device to the at least one destination device upon an unsuccessful transmission of the payload by the primary wireless link from the source device to the any destination device of the at least one destination device, wherein the unsuccessful transmission of payload is received and detected by the at least one destination device through the primary wireless module, wherein the secondary wireless module in the at least two destination devices further comprises the step of communicating between the at least two destination devices by the secondary wireless link in a private channel, wherein the private channel further comprises the step of transmitting and receiving an alternative payload and an alternative acknowledgment, wherein the alternative payload further comprises the step of being transmitted from at least one destination device to at least one other destination device and the alternative acknowledgment is transmitted from the at least one other destination device to the at least one destination device within the private channel by the secondary wireless link upon an unsuccessful transmission of the payload by the primary wireless link from the source device to the at least one other destination device.

14. The method of claim 13, wherein the transmission of the payload from the source device to one destination device of the at least one destination device by the primary wireless link and transmission of the acknowledgment from one destination device of the at least one destination device to the source device by the secondary wireless link are configured as a one-to-one connection.

15. The method of claim 13, wherein the transmission of the payload from the source device to the at least two destination devices by the primary wireless link and transmission of the acknowledgment from the at least two destination devices to the source device by the secondary wireless link are configured as a one-to-many connection.

16. A method for wireless media streaming in ultra-low latency, the method comprising:
   transmitting a payload from a source device to at least two destination devices through a primary wireless module;
   receiving and detecting a successful or an unsuccessful receival of the payload by the at least two destination devices through the primary wireless module;
   configuring one of the at least two destination devices as a mater master destination device;
   transmitting an acknowledgment from the one other of the at least two destination devices to the master destination device through a secondary wireless module and the master destination device further transmitting the acknowledgment to the source device through the primary wireless module; and
   receiving the acknowledgment from the master destination device by the source device through the primary wireless module, wherein the primary wireless module is configured to provide a primary wireless link and the secondary wireless module is configured to provide a secondary wireless link, wherein such system is configured as a virtual handshake connection between the secondary wireless modules of the at least two destination devices, including the master destination device, wherein the secondary wireless module in one of the at least two destination devices further comprises the step of communicating between the at least two destination devices by the secondary wireless link in a private channel, wherein the private channel further comprises the step of transmitting and receiving an alternative payload and an alternative acknowledgment, wherein the alternative acknowledgment further comprises the step of being transmitted from at least one destination device to the master destination device, wherein the alternative payload further comprises the step of being transmitted from at least one destination device of the at least one other destination device within the private channel by secondary wireless link for unsuccessful transmission of payload by primary wireless link from the source device to such at least one other destination device.

* * * * *